Dec. 8, 1959 E. W. MOLIS 2,916,011
SYSTEM FOR INTEGRAL INSTRUMENT LIGHTING
Filed Dec. 19, 1957

INVENTOR.
EDWARD W. MOLIS
BY
ATTORNEY

United States Patent Office 2,916,011
Patented Dec. 8, 1959

2,916,011

SYSTEM FOR INTEGRAL INSTRUMENT LIGHTING

Edward W. Molis, Davenport, Iowa, assignor to Bendix Aviation Corporation, Davenport, Iowa, a corporation of Delaware Application December 19, 1957, Serial No. 703,852

6 Claims. (Cl. 116—129)

This invention relates to display systems for instruments.

One of its objects is to provide an improved display system including a dial and a pointer and means for lighting both dial and pointer.

While applicable to instruments generally, the display system provided by the invention satisfies well the special requirements for aircraft instruments; and another object is to provide a superior display system for this application. One of the most stringent of these requirements is that virtually no light emanate from the inttrument except from the dial indicia and pointers. Meeting this condition is another object of the invention. It is accomplished by directing source light onto the dial indicia and pointer from a position ahead of them. The light source, however, is located behind the pointer and indicia so that elongation of the instrument to provide space for the light source is avoided. The provision of means by which this feature is realized is another object of the invention.

In the invention the dial and pointer are formed of transparent material having light diffusing markings on their rear surfaces. Light from a source behind a light shield is transmitted to the margins of the shield, reflected past the margins and then again reflected into the dial and pointer through which it is transmitted to the light diffusing indicia.

A preferred form of the invention makes use of the special combination of properties exhibited by polymerized methyl methacrylate sold under the trade name "Plexiglas." In addition to being light in weight, relatively infrangable and able to withstand wide temperature variations which suit it well to aircraft use, this material is readily molded and worked. More important, however, is its nearly perfert light transmission characteristic. Another object of the invention is to provide a display system utilizing these characteristics and the fact that all incident light arriving at a surface of the material at an angle greater than 42.2° will be reflected.

Other objects and advantages of the invention will hereinafter appear in the following description and illustration of one embodiment of the invention, it being understood that various modifications of the embodiment illustrated and other embodiments of the invention are possible within the spirit of the invention and the scope of the appended claims.

Figure 1:
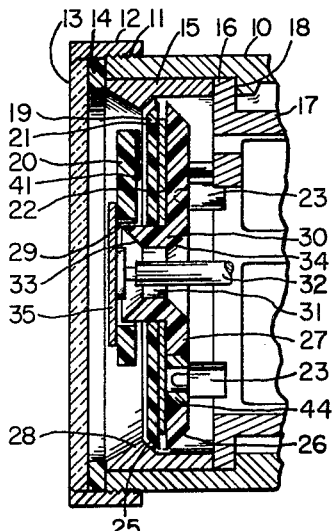
Fig. 1 is a view in central section of an instrument display system embodying the invention including a fragment of an instrument.
Figure 2:
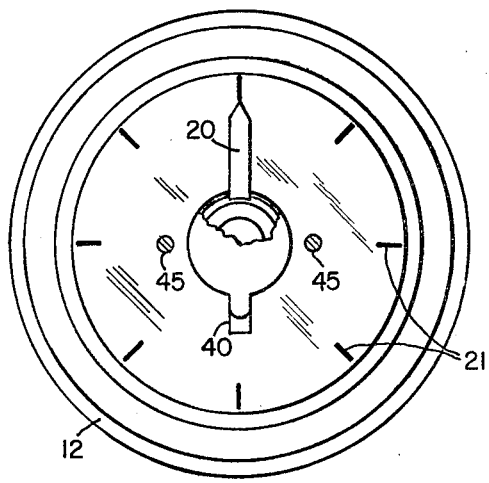
Fig. 2 is a view in front elevation of the display system shown in Fig. 1 in which a light shield is shown fragmented.
Figure 3:
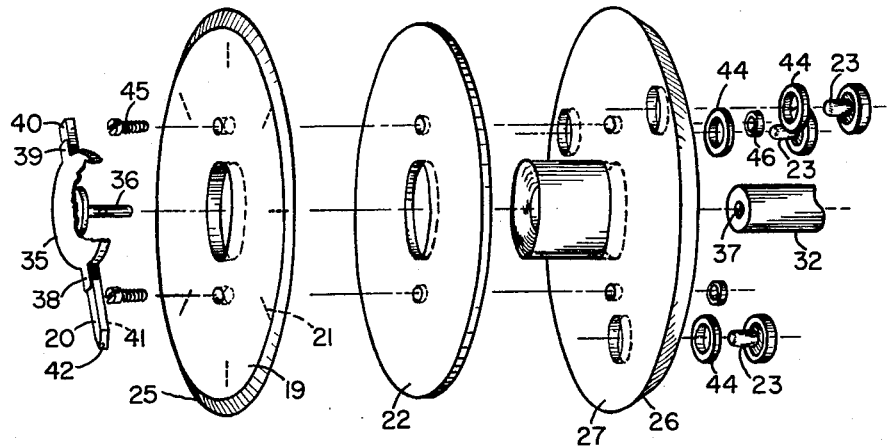
Fig. 3 is an exploded view of portions of the display system of Fig. 1 including a fragment of a light shield.

Referring to Fig. 1, the numeral 10 designates the case of an instrument, in this case an aircraft instrument, whose cylindrical forward end is externally threaded at 11 to receive the internal threads of a bezel ring 12 by which a glass window 13 is held against an elastic sealing annulus 14 interposed between the window 13 and both the outer end of case 10 and the outer end of a retaining sleeve 15. The sleeve 15 is urged by the sealing annulus 14 against the outwardly extending flange 16 of an instrument frame 17 to hold the flange against an annular shoulder 18 formed on the inner surface of case 10. The frame 17 may be employed to support the display system and in this instrument it does.

The system selected for illustration comprises a dial 19 and a pointer 20 both of which are formed of substantially transparent light transmitting material and are preferably formed of polymerized methyl methacrylate as shown. The dial 19 comprises a circular disk having suitable indicia 21 marked on its rear surface. The markings are formed of a light diffusing material such as the white paint here used.

Light shield means are provided in back of the portions of the dial 20 which are visible through window 13 for preventing the passage of light through the dial toward the window and to provide a background against which indicia on the dial are visible. The illustrated light shield 22 is a metallic disk whose upper surface is covered with a non-reflecting paint such as a layer of non-specular black paint. It is positioned below and concentric with the dial 19.

The light source is located in back of the light shield 22. Advantageously it is arranged to emit light radially outward in a plane substantially parallel to the plane of shield 22 and dial 19; and where, as here, the instrument pointer is rotatable through almost 360 degrees, it preferably comprises three light bulbs 23.

Means are provided for reflecting the light emanating from the source forward past the light shield and then laterally through the dial to the dial indicia. This means comprises a pair of reflectors or prisms, one disposed ahead the light shield 22 in the plane of the dial 10 and the other located behind the light shield in the plane of the light bulbs 23. Advantageously the reflectors are formed as beveled prism surfaces on a body of transparent material which surfaces extend around the portion of the dial required to be lighted. In the preferred form shown in the drawing, one of these surfaces is formed so that the dial tapers at substantially a 45 degree angle and becomes smaller in diameter toward its front face.

The rear reflector underlies the beveled edge 25 just beyond the outer margins of the light shield 22 and is formed as a beveled edge tapered at substantially 45 degrees toward the rear face of a flat transparent member 27. This member, which is preferably formed of polymerized methacrylate, advantageously comprises a circular disk concentric with and lying flat against the back of shield 22.

Light bulbs 23 are placed in symmetrically spaced holes in disk member 27 so that light emanating radially from the bulbs is transmitted through member 27 to its light reflecting surface 26 where it is reflected to the light reflecting surface 25. Reflected from the latter, the light is transmitted through the dial 19. Some light rays will strike the light diffusing indicia 21 and be directed out the instrument window 13 making the indicia visible through the window. It is to aid in dissipating the heat from bulbs 23 that the shield 22 is preferably formed of metal.

The beveled edges 25 and 26 are tapered at substantially 45 degrees and so will reflect almost all of the light without being silvered or otherwise treated. Surface imperfections may result in imperfect reflection so that a small quantity of light may pass through the edge 25 toward the window 13. However, any such light is prevented from being visible from the front of the instrument by interposing light shielding means between edge 25 and the window. Advantageously, this means comprises an annular flange 28 formed on the inner surface of retaining sleeve 15.

The pointer 20 is positioned in front of dial 19 and is rotatable about the axis of the dial. It comprises an elongated rectangular body of polymerized methyl methacrylate and its end 29, toward the axis of rotation, is advantageously curved on an arc whose center lies on the axis of rotation.

Means are provided for reflecting light from bulbs 23 forward through the central area of shield 22 and disk 19 to the plane of the pointer and there reflecting the light laterally into the pointer at its arcuate end 29. Where, as here, the dial is round and the pointer rotates through substantially 360 degrees, this means advantageously comprises a complete cylinder of transparent material extending through the central area of the dial 19, shield 22 and disk member 27 and having circular light reflecting surfaces in the plane of light bulbs 23 and pointer 20 respectively.

Advantageously the cylinder 30 is formed of polymerized methyl methacrylate having a central opening 31 to accommodate the rotatable instrument shaft 32. The ends of the cylinder are countersunk at an angle of substantially 45 degrees to form front and rear beveled prism edges or reflecting surfaces 33 and 34, in the plane of the pointer 20 and light bulbs 23, respectively.

Functionally, it makes little difference whether this cylinder 30 comprises a separate member or whether parts of it are formed integrally with the pointer 20 and dial 19 or disk member 27. However, certain manufacturing advantages are provided by forming the cylinder 30 integrally with the disk member 27, as shown, and this construction has proved to be desirable in a number of instruments in which the invention is being used.

To prevent any light which is not reflected by the forward reflecting surface from being visible from the front of the instrument, shield means are employed to cover the cylinder 30. While the pointer and shield could be integrally formed of polymerized methyl methacrylate and the shield covered with opaque paint, this shield cup 35 fastened at its inner bottom to a stem 36 which is fitted into a bore 37 along the axis of the instrument shaft 32. The side walls of the cup are slit at diametric points to form tabs 38 and 39 which are bent outwardly to form supports to which the pointer 20 and a counter weight 40 are secured, respectively, as by a suitable adhesive such, for example, as an epoxy resin.

The rear surface of the pointer 21 is covered with a light diffusing material such as the coating 41 of white paint. Light emitted by bulbs 23 and passing through the disk member 27 falls on all areas of the rear beveled reflecting surface 34 and is reflected forwardly through the cylinder 30 to the entire area of the forward beveled reflecting surface 33. The sides of shield cup 32 extend back beyond the forward light reflecting surface 33 so that all of the light reflected therefrom is shielded by the cup sides and by the opaque counter balance 40 except that light which is reflected into the pointer 20. This light is transmitted through the pointer where some of it strikes the white paint 41 and is diffused, making it visible from the front of the instrument.

The end 42 of the pointer is formed by two right angles so that any light transmitted through the pointer to its end will there be reflected twice and will be transmitted back toward the source. Thus this light is prevented from passing beyond the end of the pointer to light an inner surface of the case.

The light from bulbs 23 is emitted radially toward all surfaces of the disk member 27, some rays being transmitted directly to the reflecting edges 26 and 34 and other rays being reflected from the upper or lower surfaces of the member 27 one or more times before reaching reflecting edges 26 and 34. Thus the light will arrive at these reflecting edges at all incident angles and the majority of the light will be reflected to edges 25 and 33 and there reflected into the dial 19 and pointer 20 over a wide range of angles. To aid in the transmission of light by reflection through the disk member 27, the rear face of the metallic shield 22 is coated with a layer of light diffusing material such as a layer of white paint. In practice some light from all three bulbs 23 reaches all surfaces of beveled edges 26 and 34 so that when one bulb fails the result is not darkness at one portion of the dial but only a diminution of light intensity throughout the dial.

Moreover, one of the advantages of the invention lies in the fact that the reflecting surfaces are not required to be highly polished. In practice, the several polymerized methyl methacrylate pieces are molded by the methods commonly used in molding plastics and the reflecting beveled edges have a satisfactory finish requiring no additional polishing.

Filter means may be included in the light path so that only light of a selected color is transmitted to the indicia and pointer coating. Advantageously colored filter rings 44 of selective color transmitting material and surrounding the light bulbs 23 are inserted in the bulb openings in the disk member 27. During flight in daylight, daylight falling on the instrument face is reflected back from the white indicia and pointer coating which then appear white. In the absence of daylight and assuming that filters 44 transmit only red light, the pilot will see red indicia and a red pointer.

Screws 45, extending through openings in the dial 20, light shield 22 and disk member 27 hold these elements together sandwich-like against spacers 46 through which the screws 45 also extend to threaded connection with the instrument frame 17.

I claim:

1. A display system for instruments comprising a transparent dial having light diffusing indicia on its rear face, an opaque light shield underlying said rear face and said indicia, the dial having a light-reflecting beveled edge extending beyond the edges of said light shield, a transparent member underlying the beveled edges of said dial having a light reflecting front face and a light reflecting rear face, and means comprising a light source located behind said shield for emitting light rays in the direction of said transparent member and the rear face of said shield said transparent member having a light-reflecting beveled edge lying in the path of said light rays and said indicia being positioned on the rear face of said dial in the path of light emanating from said source and reflected from the beveled edge of said transparent member to the beveled edge of said dial and reflected therefrom through said dial to said indicia.

2. The invention defined in claim 1 in which said dial and said transparent member are formed of polymerized methyl methacrylate.

3. A display system for instruments comprising a transparent dial having light diffusing indicia on its rear face, an opaque light shield underlying said rear face and said indicia, the dial having light reflecting beveled edges extending beyond the edges of said light shield, a transparent member underlying the beveled edges of said dial, and means comprising a light source for emitting light rays in a plane underlying said light shield and substantially parallel thereto; said transparent member having light-reflecting beveled edges lying in said plane and said indicia being positioned on the rear face of said dial in the path of light emanating from said source and reflected from the beveled edges of said transparent member to the beveled edges of said dial and reflected therefrom through said dial to said indicia, a transparent cylindrical member extending through said light shield and dial on an axis perpendicular thereto and having circular light-reflecting beveled edges, one at its forward end in front of said dial and the other at its rearward end in back of said light shield in the plane of said light rays, a rotatable transparent pointer extending laterally from said cylindrical member opposite its forward beveled edge, said pointer having a light diffusing covering on its rearward side in the path of light rays emanating from said source and reflected from the rearward beveled edge of the cylindrical member to the forward beveled edge of said cylindrical member and there reflected into an end of said pointer.

4. The invention defined in claim 3 in which said dial, transparent member, pointer and cylindrical member are formed of polymerized methyl methacrylate, and in which said transparent member and said cylindrical member are integrally formed.

5. The invention defined in claim 3 including filter means inserted in said transparent member for transmitting from said light source to said beveled edges only light of selected colors.

6. The invention defined in claim 3 including a circular light shield positioned forwardly of and overlying the beveled edge of said dial.

References Cited in the file of this patent

UNITED STATES PATENTS

| | | |
|---|---|---|
| 2,287,605 | Dickson | June 23, 1942 |
| 2,715,886 | Smith | Aug. 23, 1955 |
| 2,761,056 | Lazo | Aug. 28, 1956 |